United States Patent
Kim et al.

(10) Patent No.: US 12,537,658 B2
(45) Date of Patent: Jan. 27, 2026

(54) METHOD AND APPARATUS FOR AUTONOMOUS CHANGING FOR DORMANT BANDWIDTH PART IN A WIRELESS COMMUNICATION SYSTEM

(71) Applicant: LG ELECTRONICS INC., Seoul (KR)

(72) Inventors: Sangwon Kim, Seoul (KR); Hanul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 390 days.

(21) Appl. No.: 17/791,724

(22) PCT Filed: Jan. 27, 2021

(86) PCT No.: PCT/KR2021/001069
§ 371 (c)(1),
(2) Date: Jul. 8, 2022

(87) PCT Pub. No.: WO2021/157940
PCT Pub. Date: Aug. 12, 2021

(65) Prior Publication Data
US 2023/0041310 A1  Feb. 9, 2023

(30) Foreign Application Priority Data

Feb. 4, 2020  (KR) .................. 10-2020-0013146

(51) Int. Cl.
*H04L 5/00* (2006.01)
*H04W 72/044* (2023.01)
(Continued)

(52) U.S. Cl.
CPC ............ *H04L 5/0098* (2013.01); *H04L 5/001* (2013.01); *H04L 5/0053* (2013.01);
(Continued)

(58) Field of Classification Search
CPC ..... H04L 5/001; H04L 5/0053; H04L 5/0098; H04W 72/0413; H04W 72/044;
(Continued)

(56) References Cited

U.S. PATENT DOCUMENTS 10,701,734 B2  6/2020  Shih et al.
2019/0090299 A1  3/2019  Ang et al.
(Continued)

FOREIGN PATENT DOCUMENTS

CN  109314972 A  2/2019
CN  109496455 A  3/2019
(Continued)

OTHER PUBLICATIONS

Section 5.1 of 3GPP TS 38.300 v15.7.0.
(Continued)

*Primary Examiner* — Kenny S Lin
*Assistant Examiner* — Rodrick Mak
(74) *Attorney, Agent, or Firm* — BRYAN CAVE LEIGHTON PAISNER LLP

(57) ABSTRACT

A method and apparatus for autonomous changing for dormant bandwidth part in a wireless communication system is provided. A wireless device configures a cell group including a certain cell on which a PUCCH is configured. A wireless device activates a dormant BWP of the certain cell to be an active BWP of the certain cell, wherein no PDCCH is configured on the dormant BWP. A wireless device switches the active BWP of the certain cell from the dormant BWP to another BWP upon triggering the scheduling request procedure, wherein at least one PDCCH is configured on the other BWP.

4 Claims, 14 Drawing Sheets

(51) Int. Cl.
*H04W 72/20* (2023.01)
*H04W 72/21* (2023.01)

(52) U.S. Cl.
CPC ......... *H04W 72/044* (2013.01); *H04W 72/20* (2023.01); *H04W 72/21* (2023.01)

(58) Field of Classification Search
CPC ......... H04W 72/1278; H04W 72/0453; H04W 72/21; H04W 72/20
See application file for complete search history.

(56) References Cited

U.S. PATENT DOCUMENTS

| | | | |
|---|---|---|---|
| 2019/0098655 A1 | 3/2019 | Shih et al. | |
| 2019/0150183 A1* | 5/2019 | Aiba | H04W 24/10 370/336 |
| 2019/0349983 A1* | 11/2019 | Loehr | H04W 72/23 |
| 2020/0059345 A1 | 2/2020 | Pelletier et al. | |
| 2020/0092833 A1* | 3/2020 | Agiwal | H04W 76/27 |
| 2020/0145280 A1* | 5/2020 | Cirik | H04L 41/0668 |
| 2020/0235898 A1* | 7/2020 | Loehr | H04W 72/21 |
| 2020/0358540 A1* | 11/2020 | Yokomakura | H04L 5/0057 |
| 2021/0099954 A1* | 4/2021 | Agiwal | H04W 52/0229 |
| 2021/0105722 A1* | 4/2021 | Tsai | H04W 52/0229 |
| 2021/0176029 A1* | 6/2021 | Tsai | H04B 7/0626 |
| 2022/0007446 A1* | 1/2022 | Purkayastha | H04W 72/23 |

FOREIGN PATENT DOCUMENTS

| | | | |
|---|---|---|---|
| CN | 110463316 A | 11/2019 | |
| CN | 110574331 A | 12/2019 | |
| CN | 110677887 A | 1/2020 | |
| EP | 3627910 | 3/2020 | |
| KR | 10-2019-0143314 A | 12/2019 | |
| WO | 2019/083245 A1 | 5/2019 | |
| WO | 2019/095243 A1 | 5/2019 | |
| WO | 2019/245297 A1 | 12/2019 | |
| WO | 2020000176 | 1/2020 | |
| WO | WO-2020086983 A1 * | 4/2020 | H04B 7/0695 |

OTHER PUBLICATIONS

Section 4.4.5 of 3GPP TS 38.211 V15.7.0.
Section 5.15 of 3GPP TS 38.321 v15.8.0.
Section 7.5 of 3GPP TS 36.300 v16.0.0.
Section 7.6 of 3GPP TS 36.300 v16.0.0.
Section 11.2 of 3GPP TS 36.300 v16.0.0.
Section 5.3 of 36.331 v15.8.0.
Oppo, Further discussion on efficient scell operation, R1-1912666, 3GPP TSG RAN WG1 #99, Reno, Nevada, US, Nov. 18-22, 2019.
Qualcomm Incorporated, Remaining issues of dormancy behaviour, R2-1914363, 3GPP TSG RAN WG2 Meeting #108, Reno, Nevada, US, Nov. 18-22, 2019.
Qualcomm Incorporated, Offline discussion summary of UL dormancy behaviour, R2-1916581, 3GPP TSG RAN WG2 Meeting #108, Reno, Nevada, US, Nov. 18-22, 2019.
ZTE Corporation, Sanechips, "On SCG Suspension", 3GPP TSG-RAN WG2 Meeting #107bis, Chongqing, China, Sep. 14-18, 2019, R2-1913491.
Vivo, "UE behaviour for a suspended SCG", 3GPP TSG-RAN WG2 Meeting #108, Reno, Nevada, USA, Nov. 18-22, 2019, R2-1914944.
Vivo, "Power saving for BWP/SCell operation in RRC_ Connected", 3GPP TSG-RAN WG2 Meeting #106, Reno, USA, May 13-17, 2019, R2-1905957 (Revision of R2-1903201).
LG Electronics, "UE autonomous BWP switching for configured UL," 3GPP TSG-RAN WG2 RAN2#101, R2-1802438, 3 pages, Mar. 2018.
ZTE Corporation, Sanechips "Further Consideration on Fast SCell Activation," 3GPP TSG-RAN WG2 Meeting #107bis, R2-1913490, 8 pages, Sep. 2019.

* cited by examiner

Contiguous BWPs configured for UE

Non-contiguous BWPs configured for UE

METHOD AND APPARATUS FOR AUTONOMOUS CHANGING FOR DORMANT BANDWIDTH PART IN A WIRELESS COMMUNICATION SYSTEM

This application is the National Stage filing under 35 U.S.C. 371 of International Application No. PCT/KR2021/001069 filed on Jan. 27, 2021, which claims priority to Korean Patent Application No. 10-2020-0013146 filed on Feb. 4, 2020, the contents of which are all hereby incorporated by reference herein in their entirety.

BACKGROUND

Technical Field

The present disclosure relates to a method and apparatus for autonomous changing for dormant bandwidth part in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

NR is a technology that operates on a very wideband compared with LTE. In order to support flexible broadband operation, NR has the following design principles different from LTE in terms of broadband support.

The ability of the network and the user equipment (UE) to support the bandwidth may be different.

The bandwidth capabilities of the downlink and uplink supported by the UE may be different.

The capabilities of the bandwidths supported by each UE may differ, so that UEs supporting different bandwidths may coexist within one network frequency band.

In order to reduce the power consumption of the UE, the UE may be configured with different bandwidth depending on the traffic load state of the UE, etc.

In order to satisfy the above-mentioned design principles, NR newly introduced a concept of bandwidth part (BWP) in addition to carrier aggregation (CA) of existing LTE.

SUMMARY

Technical Objects

A dormant SCell may be supported in NR. Similar to SCell, a dormant bandwidth part could be supported in NR. The dormant bandwidth part may be suggested to reduce UE battery consumption. For example, the dormant bandwidth part may not support PDCCH. That is, a wireless device may not monitor the PDCCH while the dormant bandwidth part is the active bandwidth part.

If the dormant bandwidth part is activated for all cells that belong to a cell group (for example, master cell group (MCG) or secondary cell group (SCG)), a wireless device may not perform the PDCCH monitoring for the cell group. Then, the wireless device could minimize the power consumption required for the PDCCH monitoring.

Though a cell group is in dormant state (for example, the dormant bandwidth part is activated for all cells that belong to a cell group), the scheduling request may still need to be triggered for the cell group, so that the essential uplink data (for example, RRC message) can be transmitted.

In this case, even though the scheduling request is triggered for a cell group, since a wireless device does not monitor the PDCCH for all cells that belong to the cell group, the wireless device cannot acquire the uplink grant to transmit the uplink data.

Therefore, studies for autonomous changing for dormant bandwidth part in a wireless communication system are required.

Technical Solutions

In an aspect, a method performed by a wireless device in a wireless communication system is provided. A wireless device configures a cell group including a certain cell on which a Physical Uplink Control Channel (PUCCH) is configured. A wireless device activates a dormant bandwidth part (BWP) of the certain cell to be an active BWP of the certain cell, wherein no Physical Downlink Control Channel (PDCCH) is configured on the dormant BWP. A wireless device switches the active BWP of the certain cell from the dormant BWP to another BWP upon triggering the scheduling request procedure, wherein at least one PDCCH is configured on the other BWP.

In another aspect, an apparatus for implementing the above method is provided.

Technical Effects

The present disclosure can have various advantageous effects.

According to some embodiments of the present disclosure, a wireless device could perform autonomous switching for dormant bandwidth part efficiently.

For example, when all cells that belong to a cell group are in dormant state for power saving, a wireless device could transmit the essential uplink (UL) data (for example, UL RRC message) by changing active bandwidth part autonomously.

According to some embodiments of the present disclosure, a wireless communication system could efficiently provide a solution for using the dormant bandwidth part by applying the autonomous changing for the dormant bandwidth part.

For example, even if all cells that belong to a cell group are in dormant state, network could receive the essential uplink (UL) data (for example, UL RRC message) by applying the autonomous bandwidth part changing for the dormant bandwidth part.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
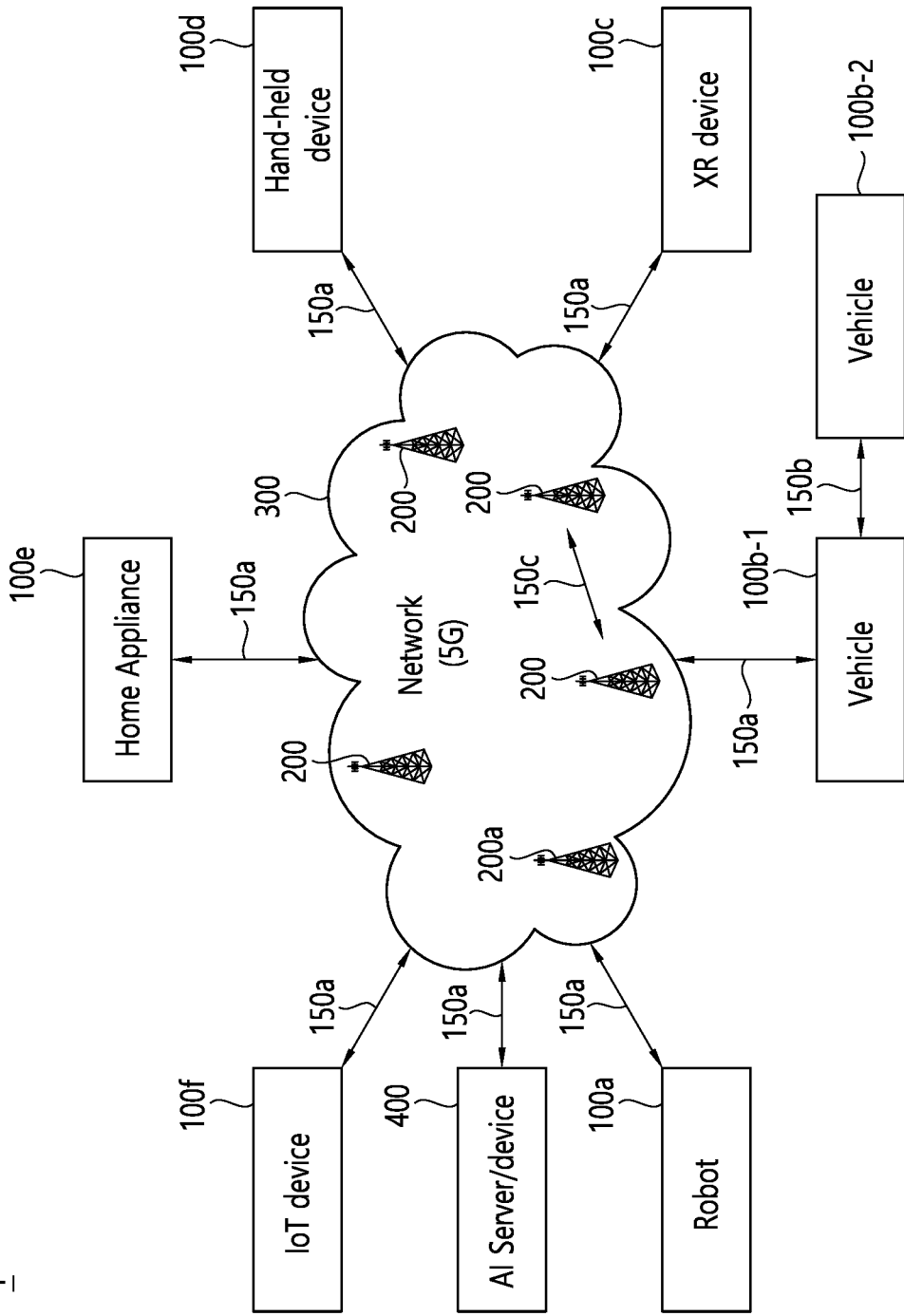
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
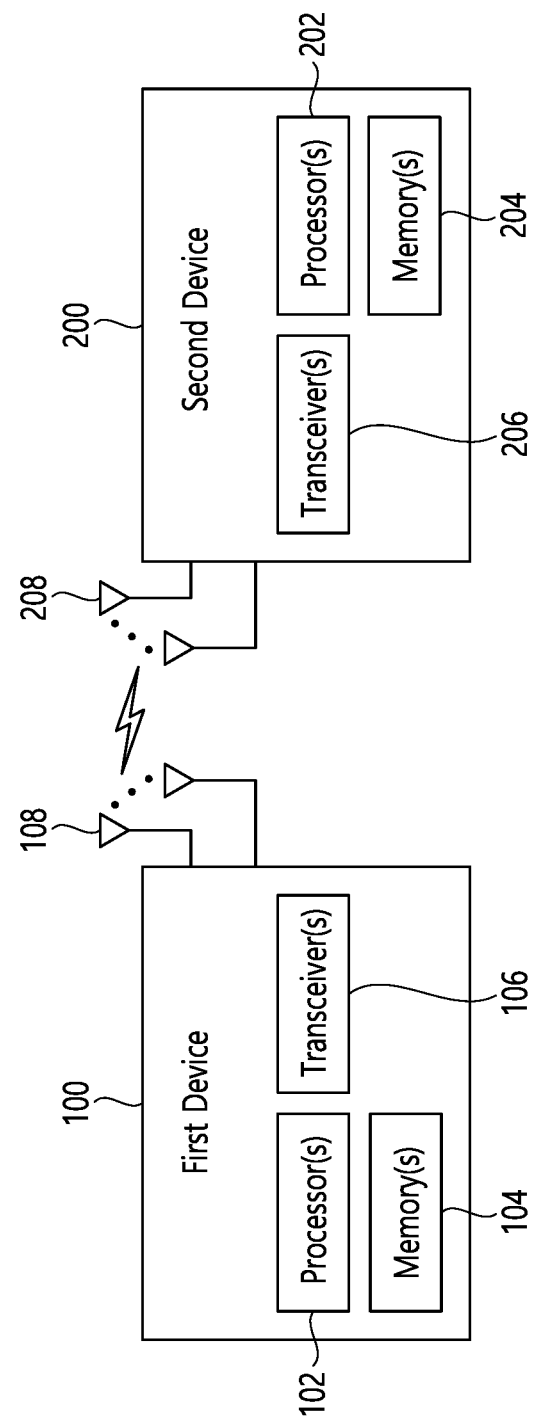
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
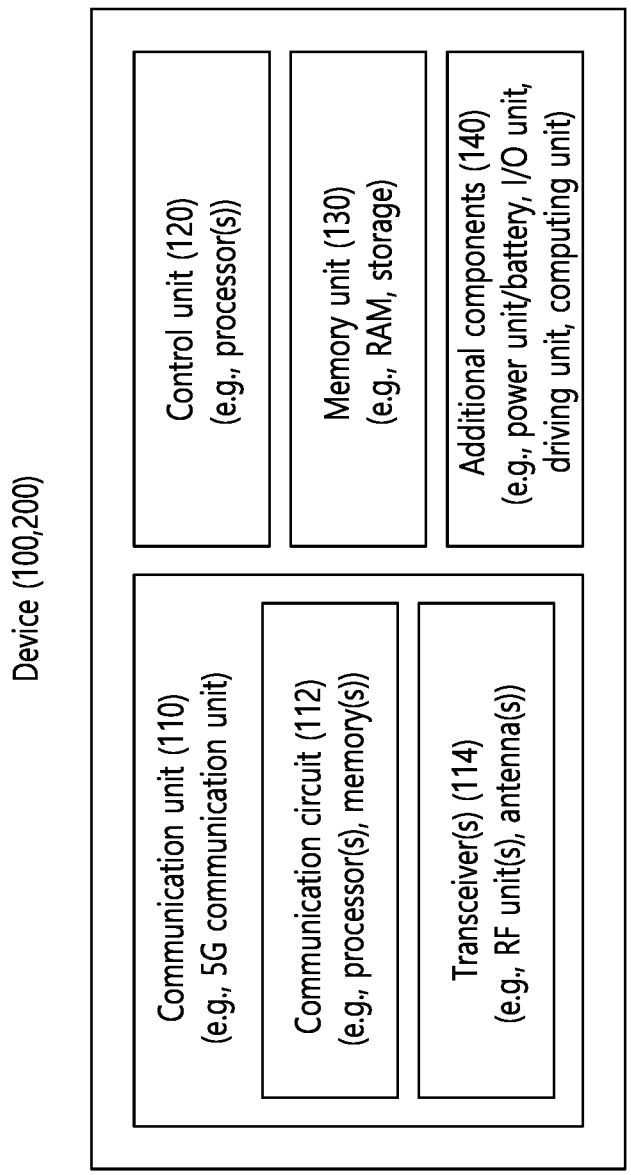
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors.

As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
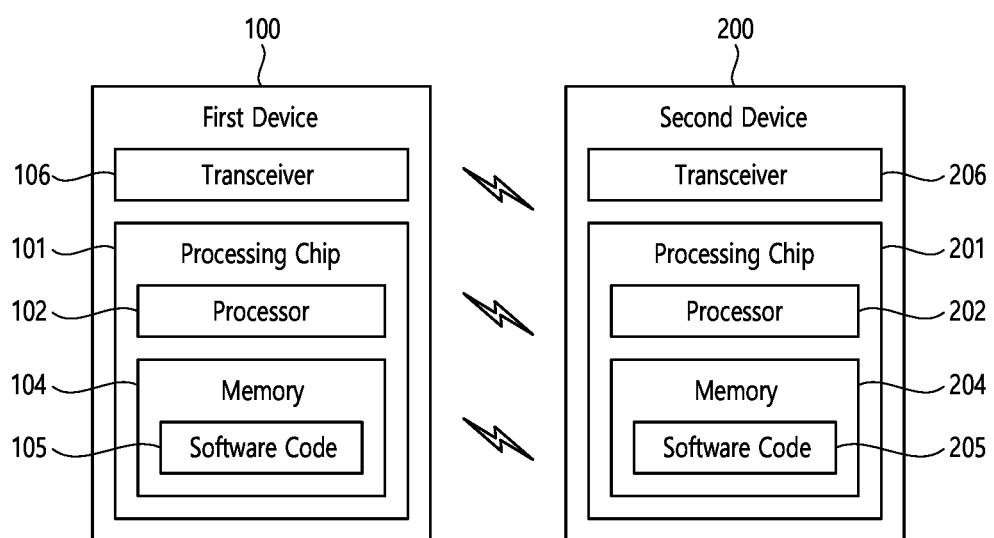
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
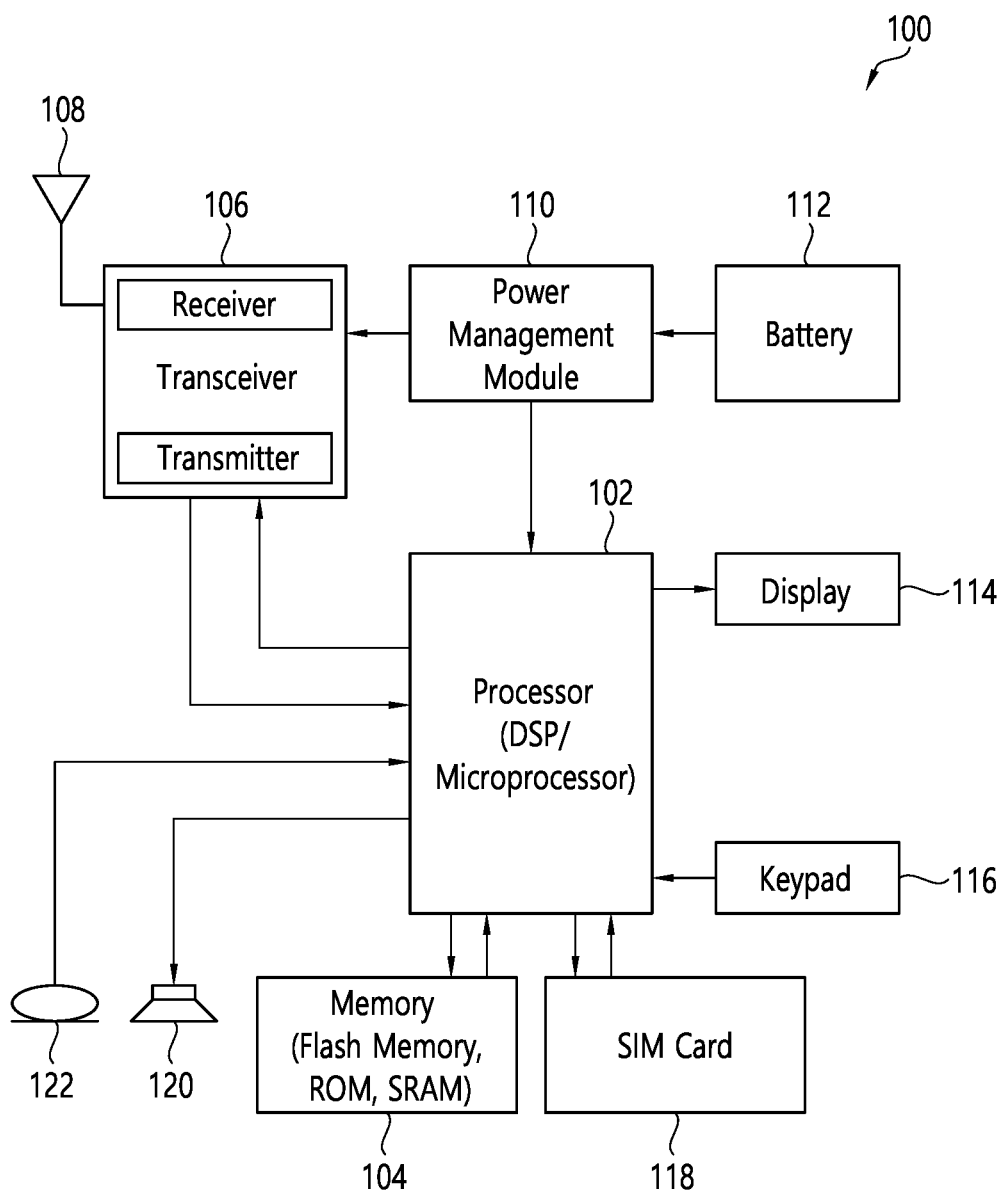
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
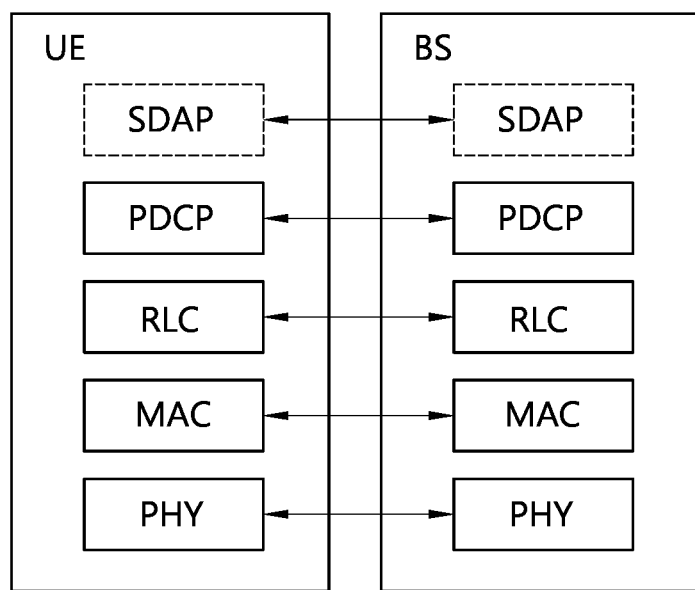
FIGS. 6 and 7 show an example of protocol stacks in a 3GPP based wireless communication system to which implementations of the present disclosure is applied.
Figure 7:
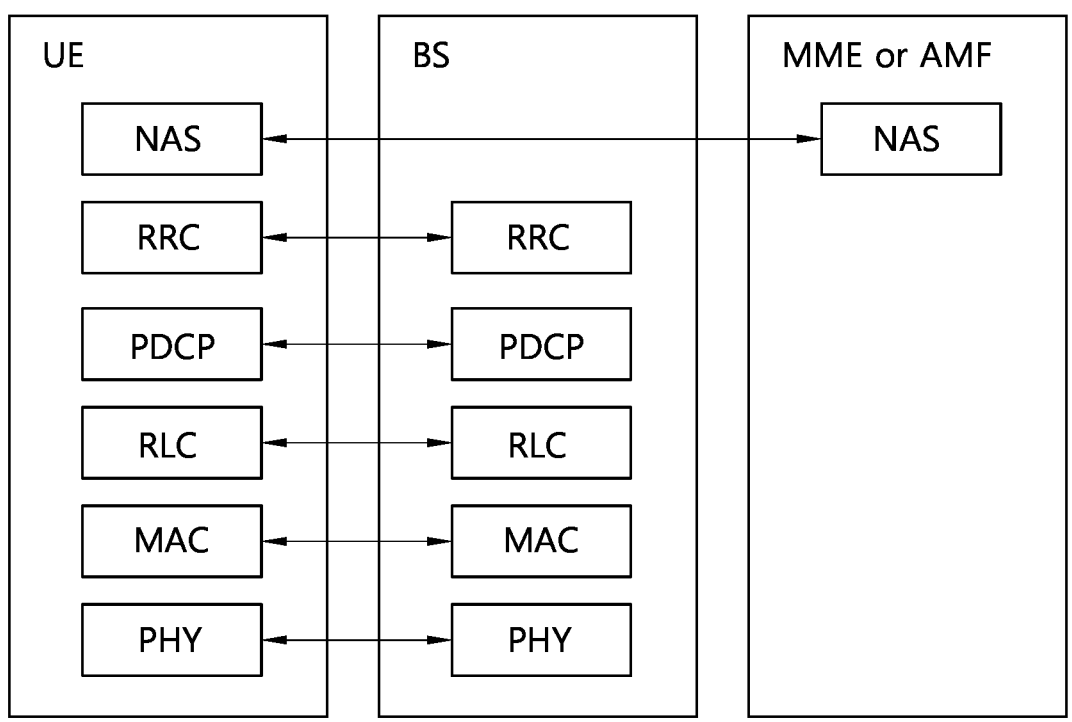

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
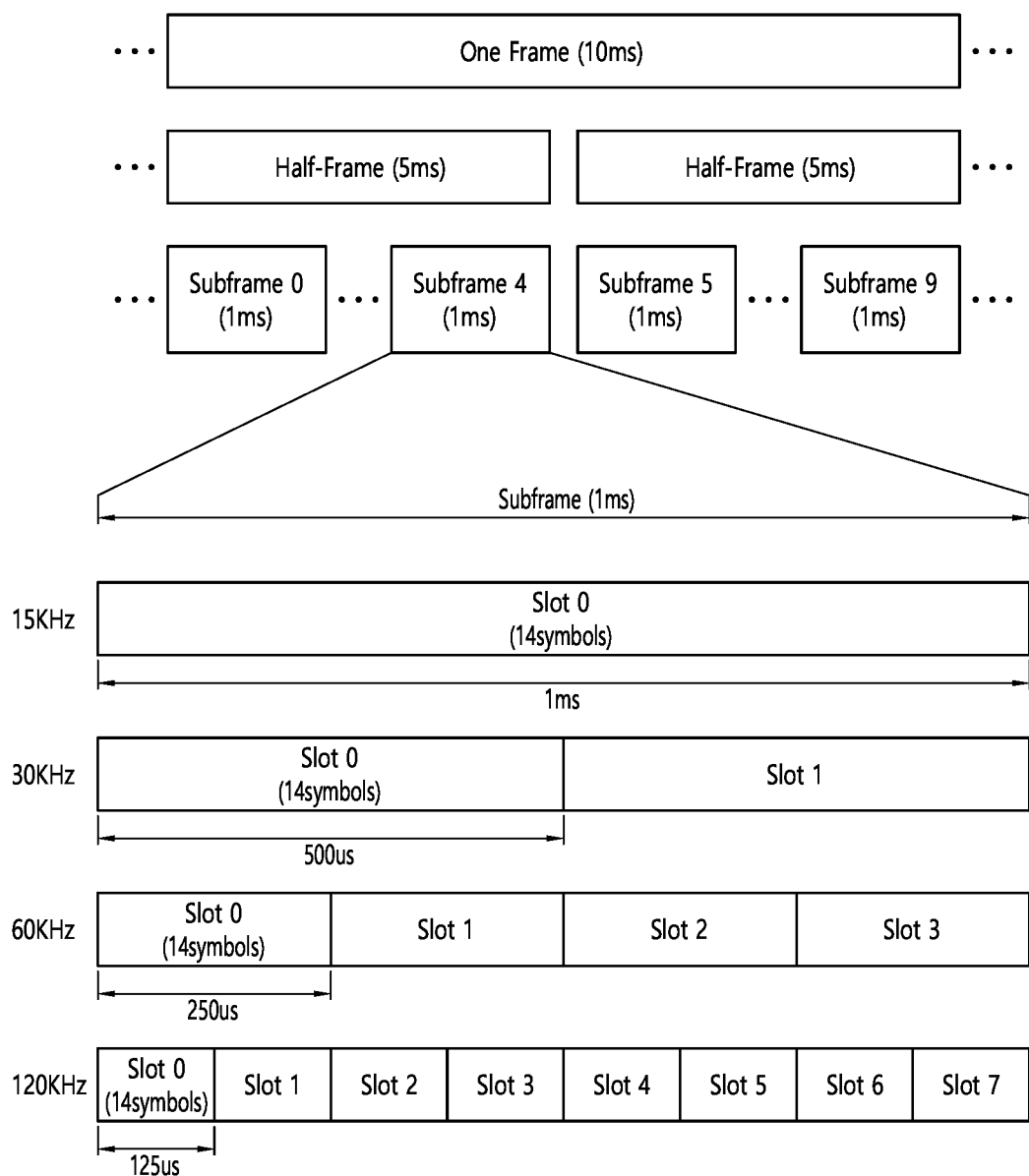
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ KHz.

Table 1 shows the number of OFDM symbols per slot $$N_{symb}^{slot},$$

the number of slots per frame $$N_{slot}^{frame,u},$$

and the number of slots per subframe $$N_{slot}^{subframe,u}$$

for the normal CP, according to the subcarrier spacing $\Delta f=2^u*15$ KHz.

TABLE 1

| u | $N_{symb}^{slot}$ | $N_{slot}^{frame,u}$ | $N_{slot}^{subframe,u}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $$N_{symb}^{slot},$$

the number of slots per frame $$N_{slot}^{frame,u},$$

and the number of slots per subframe $$N_{slot}^{subframe,u}$$

for the extended CP, according to the subcarrier spacing $\Delta f=2^u*15$ kHz.

TABLE 2

| u | $N_{symb}^{slot}$ | $N_{slot}^{frame,u}$ | $N_{slot}^{subframe,u}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $$N_{grid,x}^{size,u} * N_{sc}^{RB}$$

subcarriers and $$N_{symb}^{subframe,u}$$

OFDM symbols is defined, starting at common resource block (CRB)

$$N_{grid}^{start,u}$$

indicated by higher-layer signaling (e.g., RRC signaling), where $$N_{grid,x}^{size,u}$$

is the number of resource blocks (RBs) in the resource grid and the subscript x is DL for downlink and UL for uplink.

$$N_{sc}^{RB}$$

is the number of subcarriers per RB. In the 3GPP based wireless communication system, $$N_{sc}^{RB}$$

is 12 generally. There is one source grid for a given antenna port p, subcarrier spacing configuration u, and transmission direction (DL or UL). The carrier bandwidth $$N_{grid}^{size,u}$$

for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index/representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $$N_{BWP,i}^{size} - 1$$

where i is the number of the bandwidth part. The relation between the physical resource block $n_{PRB}$ in the bandwidth part i and the common resource block $n_{CRB}$ is as follows:

$$n_{PRB} + N_{BWP,i}^{size},$$

where $$N_{BWP,i}^{size}$$

is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz–6000 MHz | 15, 30, 60 kHz |
| FR2 | 24250 MHz–52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
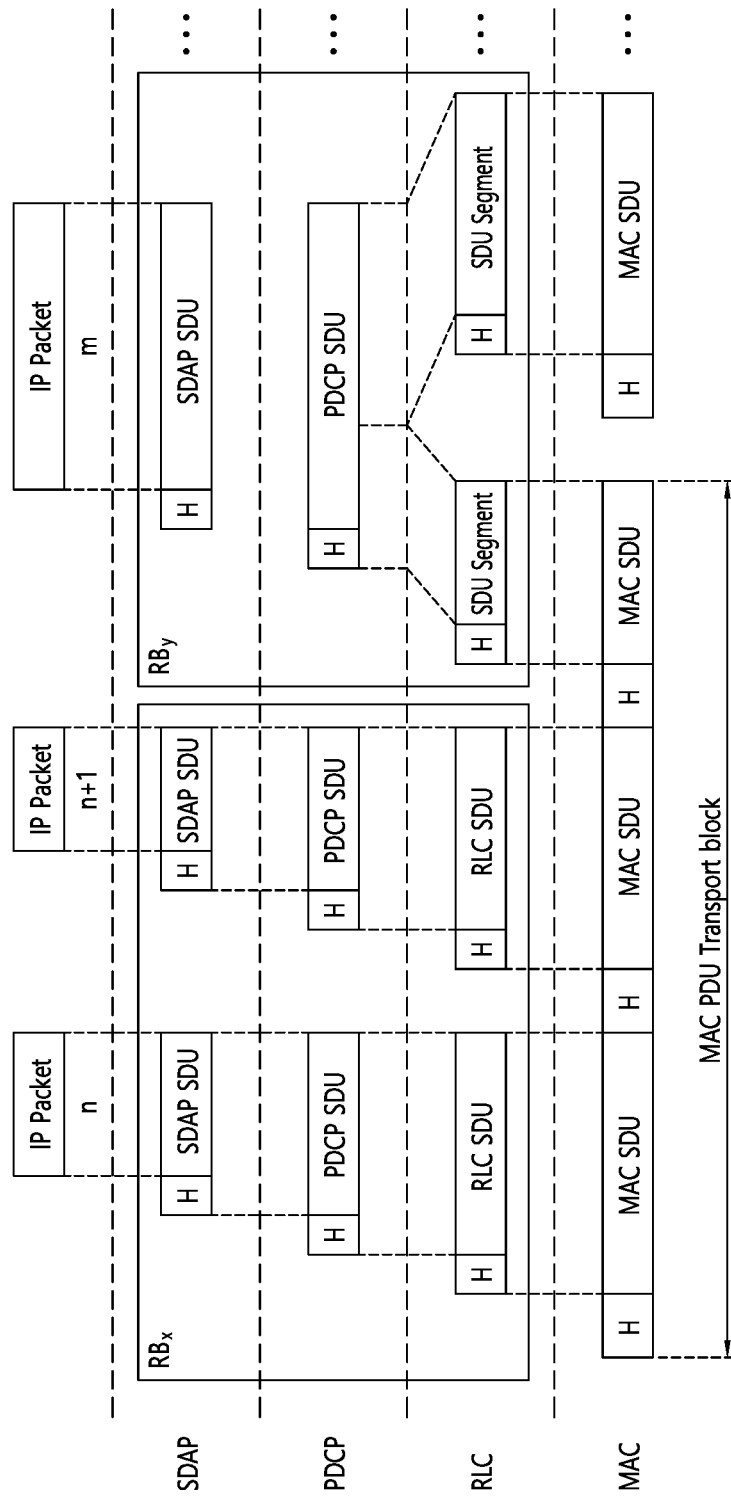
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, waveform, numerology and frame structure are described. Section 5.1 of 3GPP TS 38.300 v15.7.0 may be referred.

The downlink transmission waveform is conventional OFDM using a cyclic prefix. The uplink transmission waveform is conventional OFDM using a cyclic prefix with a transform precoding function performing DFT spreading that can be disabled or enabled.

The numerology is based on exponentially scalable sub-carrier spacing $\Delta f = 2^{\mu} * 15$ kHz with $\mu = \{0,1,3,4\}$ for PSS, SSS and PBCH and $\mu = \{0,1,2,3\}$ for other channels. Normal CP is supported for all sub-carrier spacings, Extended CP is supported for $\mu = 2$.

12 consecutive sub-carriers form a Physical Resource Block (PRB). Up to 275 PRBs are supported on a carrier.

Table 5 shows supported transmission numerologies.

TABLE 5

| u | $\Delta f = 2^{\mu} * 15$ kHz | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

The UE may be configured with one or more bandwidth parts on a given component carrier, of which only one can be active at a time respectively. The active bandwidth part defines the UE's operating bandwidth within the cell's operating bandwidth. For initial access, and until the UE's configuration in a cell is received, initial bandwidth part detected from system information is used.

Downlink and uplink transmissions are organized into frames with 10 ms duration, consisting of ten 1 ms subframes. Each frame is divided into two equally-sized half-frames of five subframes each. The slot duration is 14 symbols with Normal CP and 12 symbols with Extended CP, and scales in time as a function of the used sub-carrier spacing so that there is always an integer number of slots in a subframe.

Timing Advance TA is used to adjust the uplink frame timing relative to the downlink frame timing.

Hereinafter, Physical downlink control channels is described.

The Physical Downlink Control Channel (PDCCH) can be used to schedule DL transmissions on PDSCH and UL transmissions on PUSCH, where the Downlink Control Information (DCI) on PDCCH includes:

Downlink assignments containing at least modulation and coding format, resource allocation, and hybrid-ARQ information related to DL-SCH;

Uplink scheduling grants containing at least modulation and coding format, resource allocation, and hybrid-ARQ information related to UL-SCH.

In addition to scheduling, PDCCH can be used to for

Activation and deactivation of configured PUSCH transmission with configured grant;

Activation and deactivation of PDSCH semi-persistent transmission;

Notifying one or more UEs of the slot format;

Notifying one or more UEs of the PRB(s) and OFDM symbol(s) where the UE may assume no transmission is intended for the UE;

Transmission of TPC commands for PUCCH and PUSCH;

Transmission of one or more TPC commands for SRS transmissions by one or more UEs;

Switching a UE's active bandwidth part;

Initiating a random access procedure.

A UE monitors a set of PDCCH candidates in the configured monitoring occasions in one or more configured COntrol REsource SETs (CORESETs) according to the corresponding search space configurations.

A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET.

Polar coding is used for PDCCH.

Each resource element group carrying PDCCH carries its own DMRS.

QPSK modulation is used for PDCCH.

Hereinafter, Bandwidth part is described. Section 4.4.5 of 3GPP TS 38.211 V15.7.0 may be referred.

A bandwidth part is a subset of contiguous common resource blocks for a given numerology in bandwidth part on a given carrier.

A UE can be configured with up to four bandwidth parts in the downlink with a single downlink bandwidth part being active at a given time. The UE is not expected to receive PDSCH, PDCCH, or CSI-RS (except for RRM) outside an active bandwidth part.

A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE shall not transmit PUSCH or PUCCH outside an active bandwidth part. For an active cell, the UE shall not transmit SRS outside an active bandwidth part.

Figure 10:
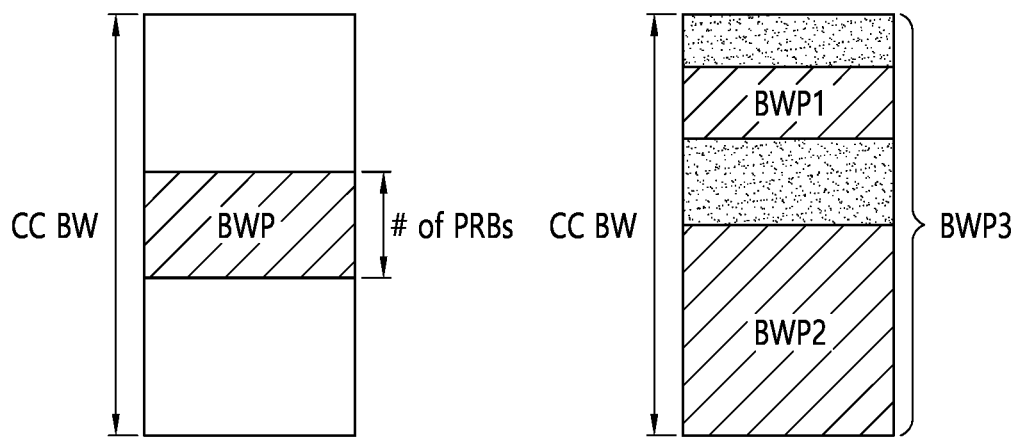
FIG. 10 shows an example of bandwidth part (BWP) configurations to which implementations of the present disclosure is applied.

FIG. 10 shows an example of bandwidth part (BWP) configurations to which implementations of the present disclosure is applied.

Referring to FIG. 10, BWP consists of a group of contiguous physical resource blocks (PRBs). The bandwidth (BW) of BWP cannot exceed the configured component carrier (CC) BW for the UE. The BW of the BWP must be at least as large as one synchronization signal (SS) block BW, but the BWP may or may not contain SS block. Each BWP is associated with a specific numerology, i.e., subcarrier spacing (SCS) and cyclic prefix (CP) type. Therefore, the BWP is also a means to reconfigure a UE with a certain numerology.

As illustrated in the right figure of FIG. 10, the network can configure multiple BWPs to a UE via radio resource control (RRC) signaling, which may overlap in frequency. The granularity of BWP configuration is one PRB. For each serving cell, DL and UL BWPs are configured separately and independently for paired spectrum and up to four BWPs can be configured for DL and UL each. For unpaired spectrum, a DL BWP and a UL BWP are jointly configured as a pair and up to 4 pairs can be configured. There can be maximally 4 UL BWPs configured for a supplemental UL (SUL) as well.

Figure 11:
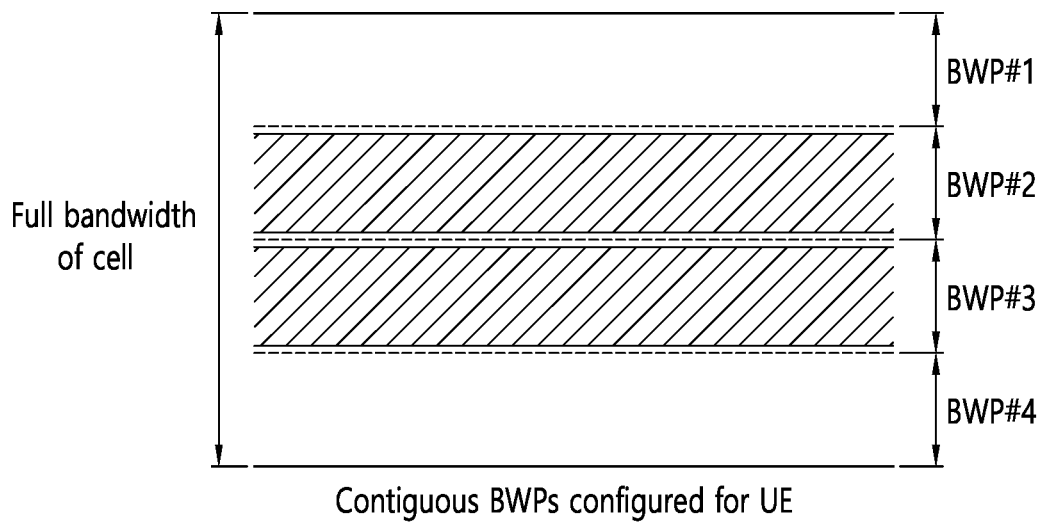
FIG. 11 shows an example of contiguous BWPs and non-contiguous BWPs to which implementations of the present disclosure is applied
Figure 11:
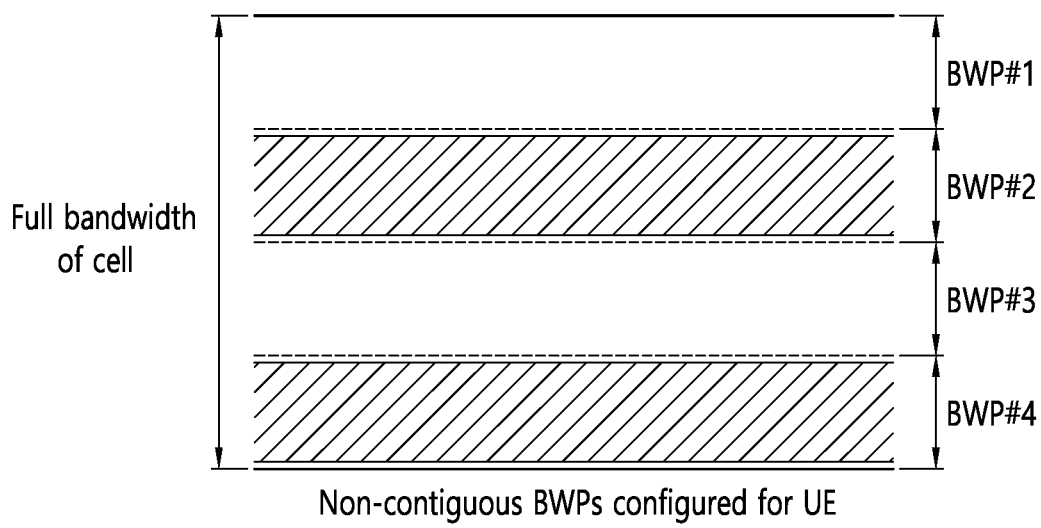

FIG. 11 shows an example of contiguous BWPs and non-contiguous BWPs to which implementations of the present disclosure is applied Referring to FIG. 11, for serving cell measurements, a UE may be configured with multiple BWPs contiguously or non-contiguously. In order to derive quality of the serving cell, the UE measures only configured BWPs, not all BWPs that belongs to the serving cell.

Each configured DL BWP includes at least one control resource set (CORESET) with UE-specific search space (USS). The USS is a searching space for UE to monitor possible reception of control information destined for the UE. In the primary carrier, at least one of the configured DL BWPs includes one CORESET with common search space (CSS). The CSS is a searching space for UE to monitor possible reception of control information common for all UEs or destined for the particular UE. If the CORESET of an active DL BWP is not configured with CSS, the UE is not required to monitor it. Note that UEs are expected to receive and transmit only within the frequency range configured for the active BWPs with the associated numerologies. However, there are exceptions. A UE may perform Radio Resource Management (RRM) measurement or transmit sounding reference signal (SRS) outside of its active BWP via measurement gap.

Figure 12:
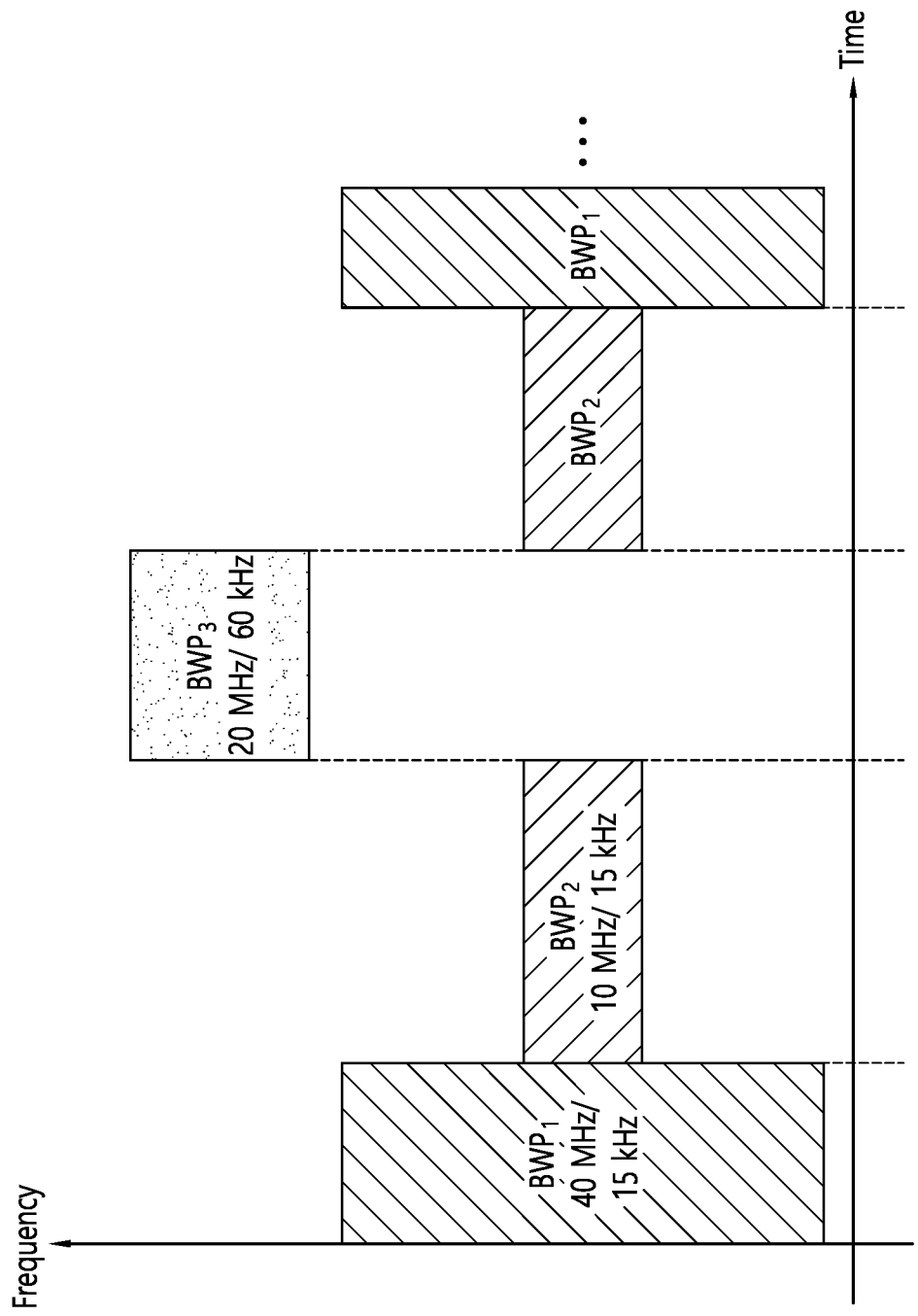
FIG. 12 shows an example of multiple BWPs to which implementations of the present disclosure is applied.

FIG. 12 shows an example of multiple BWPs to which implementations of the present disclosure is applied.

Referring to FIG. 12, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

The BWP is also a tool to switch the operating numerology of a UE. The numerology of the DL BWP configuration is used at least for the Physical Downlink Control Channel (PDCCH), Physical Downlink Shared Channel (PDSCH) and corresponding demodulation RS (DMRS). Likewise, the numerology of the UL BWP configuration is used at least for the Physical Uplink Control Channel (PUCCH), Physical Uplink Shared Channel (PUSCH) and corresponding DMRS. On the other hand, it is noted that there is a restriction in the configuration of numerology at least in the early version of NR. That is, the same numerology shall be used within the same PUCCH group including both DL and UL.

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

Referring to FIG. 12, there are 3 different BWPs are configured:

$BWP_1$ with a width of 40 MHz and subcarrier spacing of 15 kHz;

$BWP_2$ with a width of 10 MHz and subcarrier spacing of 15 kHz;

$BWP_3$ with a width of 20 MHz and subcarrier spacing of 60 KHz.

Hereinafter, Bandwidth Part (BWP) operation is described. Section 5.15 of 3GPP TS 38.321 v15.8.0 may be referred.

A Serving Cell may be configured with one or multiple BWPs.

The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signalling, or by the MAC entity itself upon initiation of Random Access procedure. Upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL.

For each activated Serving Cell configured with a BWP, the MAC entity shall:

1> if a BWP is activated:
2> transmit on UL-SCH on the BWP;
2> transmit on RACH on the BWP, if PRACH occasions are configured;
2> monitor the PDCCH on the BWP;
2> transmit PUCCH on the BWP, if configured;
2> report CSI for the BWP;
2> transmit SRS on the BWP, if configured;
2> receive DL-SCH on the BWP;
2> (re-)initialize any suspended configured uplink grants of configured grant Type 1 on the active BWP according to the stored configuration, if any, and to start in the symbol 1> if a BWP is deactivated:
2> not transmit on UL-SCH on the BWP;
2> not transmit on RACH on the BWP;
2> not monitor the PDCCH on the BWP;
2> not transmit PUCCH on the BWP;
2> not report CSI for the BWP;
2> not transmit SRS on the BWP;
2> not receive DL-SCH on the BWP;
2> clear any configured downlink assignment and configured uplink grant of configured grant Type 2 on the BWP;
2> suspend any configured uplink grant of configured grant Type 1 on the inactive BWP.

Upon initiation of the Random Access procedure on a Serving Cell, after the selection of carrier for performing Random Access procedure, the MAC entity shall for the selected carrier of this Serving Cell:

1> if PRACH occasions are not configured for the active UL BWP:
2> switch the active UL BWP to BWP indicated by initialUplinkBWP;
2> if the Serving Cell is an SpCell:
3> switch the active DL BWP to BWP indicated by initialDownlinkBWP.
1> else:
2> if the Serving Cell is an SpCell:
3> if the active DL BWP does not have the same bwp-Id as the active UL BWP:
4> switch the active DL BWP to the DL BWP with the same bwp-Id as the active UL BWP.
1> stop the bwp-InactivityTimer associated with the active DL BWP of this Serving Cell, if running.
1> if the Serving Cell is SCell:
2> stop the bwp-InactivityTimer associated with the active DL BWP of SpCell, if running.
1> perform the Random Access procedure on the active DL BWP of SpCell and active UL BWP of this Serving Cell.

If the MAC entity receives a PDCCH for BWP switching of a Serving Cell, the MAC entity shall:

1> if there is no ongoing Random Access procedure associated with this Serving Cell; or
1> if the ongoing Random Access procedure associated with this Serving Cell is successfully completed upon reception of this PDCCH addressed to C-RNTI:
2> perform BWP switching to a BWP indicated by the PDCCH.

If the MAC entity receives a PDCCH for BWP switching for a Serving Cell while a Random Access procedure associated with that Serving Cell is ongoing in the MAC entity, it is up to UE implementation whether to switch BWP or ignore the PDCCH for BWP switching, except for the PDCCH reception for BWP switching addressed to the C-RNTI for successful Random Access procedure completion in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing Random Access procedure and initiate a Random Access procedure after performing the BWP switching; if the MAC decides to ignore the PDCCH for BWP switching, the MAC entity shall continue with the ongoing Random Access procedure on the Serving Cell.

Upon reception of RRC (re-)configuration for BWP switching for a Serving Cell while a Random Access procedure associated with that Serving Cell is ongoing in the MAC entity, the MAC entity shall stop the ongoing Random Access procedure and initiate a Random Access procedure after performing the BWP switching.

The MAC entity shall for each activated Serving Cell configured with bwp-InactivityTimer:

1> if the defaultDownlinkBWP-Id is configured, and the active DL BWP is not the BWP indicated by the defaultDownlinkBWP-Id; or
1: if the defaultDownlinkBWP-Id is not configured, and the active DL BWP is not the initialDownlinkBWP:

2> if a PDCCH addressed to C-RNTI or CS-RNTI indicating downlink assignment or uplink grant is received on the active BWP; or
2> if a PDCCH addressed to C-RNTI or CS-RNTI indicating downlink assignment or uplink grant is received for the active BWP; or
2> if a MAC PDU is transmitted in a configured uplink grant or received in a configured downlink assignment:
3> if there is no ongoing Random Access procedure associated with this Serving Cell; or
3> if the ongoing Random Access procedure associated with this Serving Cell is successfully completed upon reception of this PDCCH addressed to C-RNTI:
4> start or restart the bwp-InactivityTimer associated with the active DL BWP.
2> if the bwp-InactivityTimer associated with the active DL BWP expires:
3> if the defaultDownlinkBWP-Id is configured:
4> perform BWP switching to a BWP indicated by the defaultDownlinkBWP-Id.
3> else:
4> perform BWP switching to the initialDownlinkBWP.

If a Random Access procedure is initiated on an SCell, both this SCell and the SpCell are associated with this Random Access procedure.
1> if a PDCCH for BWP switching is received, and the MAC entity switches the active DL BWP:
2> if the defaultDownlinkBWP-Id is configured, and the MAC entity switches to the DL BWP which is not indicated by the defaultDownlinkBWP-Id; or
2> if the defaultDownlinkBWP-Id is not configured, and the MAC entity switches to the DL BWP which is not the initialDownlinkBWP:
3> start or restart the bwp-InactivityTimer associated with the active DL BWP.

Hereinafter, Scheduling Request is described.

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the logical channel that triggered the BSR (if such a configuration exists) is considered as corresponding SR configuration for the triggered SR.

RRC configures the following parameters for the scheduling request procedure:
sr-ProhibitTimer (per SR configuration);
sr-TransMax (per SR configuration).

The following UE variables are used for the scheduling request procedure:
SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled. All pending SR(s) triggered prior to the MAC PDU assembly shall be cancelled and each respective sr-ProhibitTimer shall be stopped when the MAC PDU is transmitted and this PDU includes a Long or Short BSR MAC CE which contains buffer status up to (and including) the last event that triggered a BSR prior to the MAC PDU assembly. All pending SR(s) shall be cancelled and each respective sr-ProhibitTimer shall be stopped when the UL grant(s) can accommodate all pending data available for transmission.

Only PUCCH resources on a BWP which is active at the time of SR transmission occasion are considered valid.

As long as at least one SR is pending, the MAC entity shall for each pending SR:
1> if the MAC entity has no valid PUCCH resource configured for the pending SR:
2> initiate a Random Access procedure on the SpCell and cancel the pending SR.
1> else, for the SR configuration corresponding to the pending SR:
2> when the MAC entity has an SR transmission occasion on the valid PUCCH resource for SR configured; and
2> if sr-ProhibitTimer is not running at the time of the SR transmission occasion; and
2> if the PUCCH resource for the SR transmission occasion does not overlap with a measurement gap; and
2> if the PUCCH resource for the SR transmission occasion does not overlap with a UL-SCH resource:
3> if SR_COUNTER < sr-TransMax:
4> increment SR_COUNTER by 1;
4> instruct the physical layer to signal the SR on one valid PUCCH resource for SR;
4> start the sr-ProhibitTimer.
3> else:
4> notify RRC to release PUCCH for all Serving Cells;
4> notify RRC to release SRS for all Serving Cells;
4> clear any configured downlink assignments and uplink grants;
4> clear any PUSCH resources for semi-persistent CSI reporting;
4> initiate a Random Access procedure on the SpCell and cancel all pending SRs.

The selection of which valid PUCCH resource for SR to signal SR on when the MAC entity has more than one overlapping valid PUCCH resource for the SR transmission occasion is left to UE implementation.

If more than one individual SR triggers an instruction from the MAC entity to the PHY layer to signal the SR on the same valid PUCCH resource, the SR_COUNTER for the relevant SR configuration is incremented only once.

The MAC entity may stop, if any, ongoing Random Access procedure due to a pending SR which has no valid PUCCH resources configured, which was initiated by MAC entity prior to the MAC PDU assembly. Such a Random Access procedure may be stopped when the MAC PDU is transmitted using a UL grant other than a UL grant provided by Random Access Response, and this PDU includes a BSR MAC CE which contains buffer status up to (and including) the last event that triggered a BSR prior to the MAC PDU assembly, or when the UL grant(s) can accommodate all pending data available for transmission.

Hereinafter, Buffer Status Reporting is described.

The MAC entity shall:
1> if the Buffer Status reporting procedure determines that at least one BSR has been triggered and not cancelled:
2> if UL-SCH resources are available for a new transmission and the UL-SCH resources can accommodate the BSR MAC CE plus its subheader as a result of logical channel prioritization:
3> instruct the Multiplexing and Assembly procedure to generate the BSR MAC CE(s);

3> start or restart periodicBSR-Timer except when all the generated BSRs are long or short Truncated BSRs;
3> start or restart retxBSR-Timer.
2> if a Regular BSR has been triggered and logicalChannelSR-DelayTimer is not running:
3> if there is no UL-SCH resource available for a new transmission; or
3> if the MAC entity is configured with configured uplink grant(s) and the Regular BSR was triggered for a logical channel for which logicalChannelSR-Mask is set to false; or
3> if the UL-SCH resources available for a new transmission do not meet the LCP mapping restrictions configured for the logical channel that triggered the BSR:
4> trigger a Scheduling Request.

Hereinafter, operation related to dormant state is described. Sections 7.5, 7.6, and 11.2 of 3GPP TS 36.300 v16.0.0 and section 5.3 of 36.331 v15.8.0 may be referred.

Carrier Aggregation is described.

When CA is configured, the UE only has one RRC connection with the network. At RRC connection establishment/re-establishment/handover, one serving cell provides the NAS mobility information (e.g. TAI), and at RRC connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC).

Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC).

The configured set of serving cells for a UE therefore always consists of one PCell and one or more SCells:

For each SCell the usage of uplink resources by the UE in addition to the downlink ones is configurable (the number of DL SCCs configured is therefore always larger than or equal to the number of UL SCCs and no SCell can be configured for usage of uplink resources only);
An SCell may be configured to start in either deactivated, dormant or activated mode;
From a UE viewpoint, each uplink resource only belongs to one serving cell;
The number of serving cells that can be configured depends on the aggregation capability of the UE;
PCell can only be changed with handover procedure (i.e. with security key change and, unless RACH-less HO is configured, with RACH procedure);
PCell is used for transmission of PUCCH;
If DC is not configured one additional PUCCH can be configured on an SCell, the PUCCH SCell;
Unlike SCells, PCell cannot be de-activated or be in dormant SCell state;
Re-establishment is triggered when PCell experiences RLF, not when SCells experience RLF;
NAS information is taken from PCell.

The reconfiguration, addition and removal of SCells can be performed by RRC. At intra-LTE handover, RRC can also add, remove, or reconfigure SCells for usage with the target PCell. When adding a new SCell, dedicated RRC signalling is used for sending all required system information of the SCell i.e. while in connected mode, UEs need not acquire broadcasted system information directly from the SCells. A common configuration, applicable for multiple SCells, may be provided in addition to dedicated SCell configuration.

When a PUCCH SCell is configured, RRC configures the mapping of each serving cell to Primary PUCCH group or Secondary PUCCH group, i.e., for each SCell whether the PCell or the PUCCH SCell is used for the transmission of ACK/NAKs and CSI reports. A PUCCH SCell cannot be in dormant state.

Dual Connectivity is described.

In DC, the configured set of serving cells for a UE consists of two subsets: the Master Cell Group (MCG) containing the serving cells of the MeNB, and the Secondary Cell Group (SCG) containing the serving cells of the SeNB.

When a UE is configured with CA in the MCG, the same principles apply to MCG.

For SCG, the following principles are applied:

At least one cell in SCG has a configured UL CC and one of them, named PSCell, is configured with PUCCH resources;
When SCG is configured, there is always at least one SCG bearer or one Split bearer;
Upon detection of a physical layer problem or a random access problem on PSCell, or the maximum number of RLC retransmissions has been reached associated with the SCG, or upon detection of an access problem on PSCell (T307 expiry) during SCG change, or when exceeding the maximum transmission timing difference between CGs:
RRC connection Re-establishment procedure is not triggered;
All UL transmissions towards all cells of the SCG are stopped;
MeNB is informed by the UE of SCG failure type;
For split bearer, the DL data transfer over the MeNB is maintained.
Only the RLC AM bearer can be configured for the split bearer;
Like PCell, PSCell cannot be de-activated and cannot be in dormant SCell state;

Activation/Deactivation Mechanism is described.

To enable reasonable UE battery consumption when CA is configured, an activation/deactivation mechanism of SCells is supported (i.e. activation/deactivation does not apply to PCell). When an SCell is deactivated, the UE does not need to receive the corresponding PDCCH or PDSCH, cannot transmit in the corresponding uplink, nor is it required to perform CQI measurements. Conversely, when an SCell is active, the UE shall receive PDSCH and PDCCH (if the UE is configured to monitor PDCCH from this SCell), and is expected to be able to perform CQI measurements. To enable faster CQI reporting, a temporary CQI reporting period (called short CQI period) can be supported during SCell activation period. E-UTRAN ensures that while PUCCH SCell is deactivated, SCells of secondary PUCCH group should not be activated or dormant. E-UTRAN ensures that SCells mapped to PUCCH SCell are deactivated before the PUCCH SCell is changed or removed.

To enable faster transition to activated state, a dormant state for SCells (i.e. not PCell or PSCell) is supported. When an SCell is in dormant state, the UE does not need to receive the corresponding PDCCH or PDSCH, cannot transmit in the corresponding uplink, but is required to perform CQI measurements. A PUCCH SCell cannot be in dormant state.

The activation/deactivation mechanism is based on the combination of a MAC control element and deactivation timers. The MAC control element carries a bitmap for the activation and deactivation of SCells: a bit set to 1 denotes activation of the corresponding SCell, while a bit set to 0 denotes deactivation. With the bitmap, SCells can be activated and deactivated individually, and a single activation/deactivation command can activate/deactivate a subset of the SCells. One deactivation timer is maintained per SCell but one common value is configured per UE by RRC.

The state transitions to and from dormant SCell state use MAC control elements.

At reconfiguration without mobility control information:
SCells added to the set of serving cells are initially "deactivated", "dormant" or "activated";
SCells which remain in the set of serving cells (either unchanged or reconfigured) do not change their activation status ("activated", "deactivated" or "dormant").

At reconfiguration with mobility control information (i.e. handover):
SCells are "deactivated", "dormant" or "activated".

In DC, the serving cells of the MCG other than the PCell can only be activated/deactivated by the MAC Control Element received on MCG, and the serving cells of the SCG other than PSCell can only be activated/deactivated by the MAC Control Element received on SCG. The MAC entity applies the bitmap for the associated cells of either MCG or SCG. PSCell in SCG is always activated like the PCell (i.e. deactivation timer is not applied to PSCell). With the exception of PUCCH SCell, one deactivation timer is maintained per SCell but one common value is configured per CG by RRC.

Reception of an RRCConnectionReconfiguration including the mobilityControlInfo by the UE (handover) is described.

1> for each SCell configured for the UE other than the PSCell:
2> if the received RRCConnectionReconfiguration message includes sCellState for the SCell and indicates activated:
3> configure lower layers to consider the SCell to be in activated state;
2> else if the received RRCConnectionReconfiguration message includes sCellState for the SCell and indicates dormant:
3> configure lower layers to consider the SCell to be in dormant state;
2> else:
3> configure lower layers to consider the SCell to be in deactivated state.

SCell addition/modification is described.
The UE shall:
1> for each sCellIndex value included either in the sCellToAddModList or in the sCellToAddModListSCG that is not part of the current UE configuration (SCell addition):
2> add the SCell, corresponding to the cellIdentification, in accordance with the radioResourceConfigCommonSCell and radioResourceConfigDedicatedSCell, both included either in the sCellToAddModList or in the sCellToAddModListSCG;
2> if sCellState is configured for the SCell and indicates activated:
3> configure lower layers to consider the SCell to be in activated state;
2> else if sCellState is configured for the SCell and indicates dormant:
3> configure lower layers to consider the SCell to be in dormant state.

As described above, a dormant SCell could be supported in NR. Similar to SCell, a dormant bandwidth part may be suggested in NR. The dormant bandwidth part may be applied to reduce UE battery consumption. For example, the dormant bandwidth part may not support PDCCH. That is, a wireless device may not monitor the PDCCH while the dormant bandwidth part is activated.

If the dormant bandwidth part is activated for all cells that belong to a cell group (for example, master cell group (MCG) or secondary cell group (SCG)), a wireless device may not perform the PDCCH monitoring for the cell group. Then, the wireless device could minimize the power consumption required for the PDCCH monitoring.

Though a cell group is in dormant state (for example, the dormant bandwidth part is activated for all cells that belong to a cell group), the scheduling request may still need to be triggered for the cell group, so that the essential uplink data (for example, RRC message) can be transmitted.

In this case, even though the scheduling request is triggered for a cell group, since a wireless device does not monitor the PDCCH for all cells that belong to the cell group, the wireless device cannot acquire the uplink grant to transmit the uplink data.

Therefore, studies for autonomous changing for dormant bandwidth part in a wireless communication system are required.

Hereinafter, a method for autonomous changing for dormant bandwidth part in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 13:
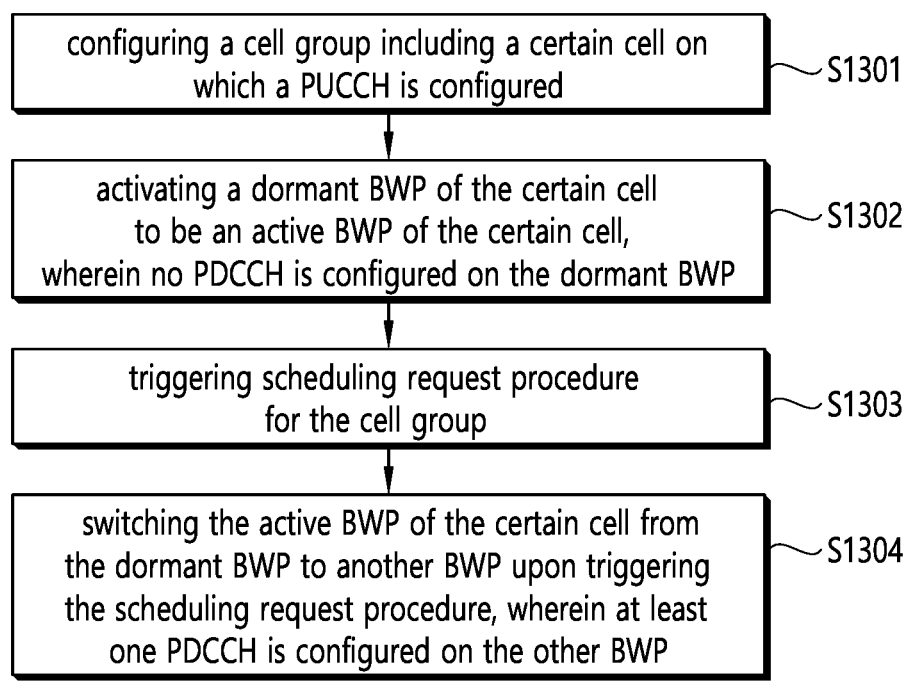
FIG. 13 shows an example of a method for autonomous changing for dormant bandwidth part in a wireless communication system, according to some embodiments of the present disclosure.

FIG. 13 shows an example of a method for autonomous changing for dormant bandwidth part in a wireless communication system, according to some embodiments of the present disclosure.

In particular, FIG. 13 shows an example of a method performed by a wireless device.

In step S1301, a wireless device may configure a cell group including a certain cell on which a Physical Uplink Control Channel (PUCCH) is configured.

For example, a wireless device may establish a dual connectivity with a network. For example, a wireless device may configure a Master Cell Group (MCG) and a Secondary Cell Group (SCG) with the network. For example, the cell group may be a Master Cell Group (MCG) or a Secondary Cell Group (SCG) in a dual connectivity.

According to some embodiments of the present disclosure, the cell group may be an SCG.

For example, the certain cell may be a Primary SCell (PSCell) or a PUCCH SCell. The PSCell and the PUCCH SCell may be included in the SCG. The PSCell and the PUCCH SCell may configure at least one PUCCH.

For example, one additional PUCCH may be configured on an SCell, and the SCell may be referred as the PUCCH SCell.

According to some embodiments of the present disclosure, a wireless device may select the certain cell among the SCG.

For example, cell 1, 2, 3 and 4 may belong to an SCG, and PDCCH may be configured for cell 1, 2, and 3. In this case, a wireless device may choose cell 1, 2, or 3 as the certain cell.

According to some embodiments of the present disclosure, the certain cell may be set by network per cell group.

According to some embodiments of the present disclosure, the certain cell may be more than one cell. If the certain cell is more than one, the wireless device may change the active bandwidth part of the more than one cell, in the following steps. For example, a wireless device may change the active BWP of all cells in the SCG, from dormant BWP to another BWP, respectively.

In step S1302, a wireless device may activate a dormant bandwidth part (BWP) of the certain cell to be an active BWP of the certain cell. No Physical Downlink Control Channel (PDCCH) may be configured on the dormant BWP.

In other words, a wireless device may determine or assign a dormant bandwidth part (BWP), which is not configured with PDCCH, of the certain cell to be an active BWP of the certain cell.

For example, the dormant bandwidth part may be activated by the BWP switching. The BWP switching may be controlled (1) by the PDCCH indicating a downlink assignment or an uplink grant, (2) by the bwp-InactivityTimer, (3) by RRC signalling, and/or (4) by the MAC entity itself upon initiation of Random Access procedure. Upon activation of the dormant BWP, the wireless device may not need to monitor PDCCH for the corresponding cell.

In other words, while the dormant BWP of the certain cell is activated, a wireless device may skip to monitor PDCCH on the certain cell, since there is no PDCCH on the dormant BWP of the certain cell.

According to some embodiments of the present disclosure, the cell group may be an SCG, and the wireless device may activate each dormant BWP of the PSCell and the PUCCH SCell to be an active BWP, respectively.

According to some embodiments of the present disclosure, the wireless device may activate each dormant BWP of all cells belonging to the cell group to be an active BWP, respectively.

According to some embodiments of the present disclosure, the wireless device may activate each dormant BWP of all cells configuring a PUCCH among the cell group to be an active BWP, respectively.

According to some embodiments of the present disclosure, a wireless device may consider a cell is a dormant cell or in a dormant state, if PDCCH is not configured for active bandwidth part of the cell.

For example, a wireless device may consider a cell group is in dormant state, if the corresponding SpCell (for example, PCell or PSCell) is in dormant state.

For example, a wireless device may consider a cell group is in dormant state if all cells that belong to the cell group is in dormant state. For other example, a wireless device may determine whether a cell group is in dormant or not based on activated serving cell only. A wireless device may consider a cell group is in dormant state if all activated serving cells that belong to the cell group is in dormant state.

In step S1303, a wireless device may trigger scheduling request procedure for the cell group.

During the scheduling request procedure, a wireless device may transmit a scheduling request to a network via the PUCCH configured on the certain cell.

For example, a wireless device may transmit the scheduling request to the network before switching the active BWP of the certain cell. In this case, the PUCCH may be configured on the dormant BWP of the certain cell.

For other example, a wireless device may transmit the scheduling request to the network after switching the active BWP of the certain cell. In this case, the PUCCH may be configured on the other BWP of the certain cell.

According to some embodiments of the present disclosure, the scheduling request may be triggered for the dormant cell group. In other words, the scheduling request may be triggered in a MAC entity corresponding to the cell group in dormant state.

In step S1304, a wireless device may switch the active BWP of the certain cell from the dormant BWP to another BWP upon triggering the scheduling request procedure. At least one PDCCH may be configured on the other BWP.

For example, a wireless device may monitor the at least one PDCCH configured on the other BWP of the certain cell, after switching the active BWP of the certain cell.

For example, a wireless device may acquire an uplink resource via the at least one PDCCH configured on the other BWP of the certain cell in response to the scheduling request procedure.

For example, the other BWP may be an initial BWP. For example, the initial BWP may be a BWP used for initial access. For example, the initial BWP may be detected from system information. For example, the initial BWP may be referred to by BWP-Id=0.

For example, the other BWP may be a default BWP. For example, the default BWP may be a BWP to be used upon expiry of the BWP inactivity timer. For example, the wireless device may use the initial BWP as the default BWP.

For example, network may predefine the other BWP.

According to some embodiments of the present disclosure, a wireless device may perform the switching, based on that each activated BWP of all cells configuring at least one PUCCH in the cell group is a dormant BWP respectively.

For example, a cell configuring at least one PUCCH may be able to transmit the scheduling request to the network. Since all cells being able to transmit the scheduling request do not monitor the PDCCH in dormant state, the wireless device could not receive uplink resource in response to the scheduling request. In this case, by performing the BWP switching on the certain cell, the wireless device could monitor the PDCCH on the other BWP of the certain cell, and acquire the uplink resource via the PDCCH on the other BWP of the certain cell.

According to some embodiments of the present disclosure, a wireless device may determine that the cell group is in dormant state based on that each activated BWP of all cells belonging to the cell group is a dormant BWP, respectively. For example, a wireless device may perform the switching, based on the determination that the SCG is in dormant state.

In other words, a wireless device may perform the switching, based on that each activated BWP of all cells belonging to the SCG is a dormant BWP, respectively.

For example, since all cells belong to the cell group do not monitor the PDCCH in dormant state, the wireless device could not receive uplink resource in response to the scheduling request. In this case, by performing the BWP switching on the certain cell, the wireless device could monitor the PDCCH on the other BWP of the certain cell and acquire the uplink resource via the PDCCH on the other BWP of the certain cell.

According to some embodiments of the present disclosure, the wireless device may be in communication with at least one of a user equipment, a network, or an autonomous vehicle other than the wireless device.

Figure 14:
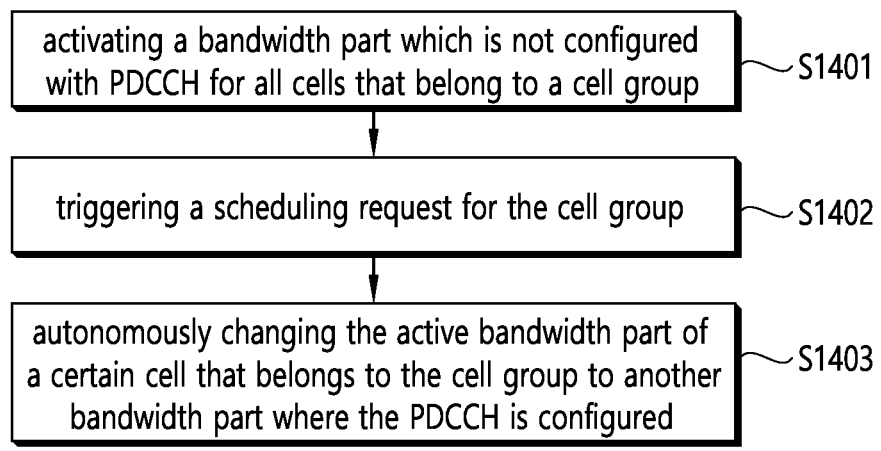
FIG. 14 shows an example of a method for autonomous changing for dormant bandwidth part in a wireless communication system, according to some embodiments of the present disclosure.

FIG. 14 shows an example of a method for autonomous changing for dormant bandwidth part in a wireless communication system, according to some embodiments of the present disclosure.

According to the present disclosure, UE may autonomously change the active bandwidth part from a bandwidth part not configured with PDCCH to another bandwidth part configured with PDCCH, when a scheduling request is triggered.

For example, UE may autonomously change the active bandwidth part from a dormant bandwidth part to non-dormant bandwidth part based on triggering of the scheduling request.

For example, UE may transmit the scheduling request before or after changing the active bandwidth part.

For example, UE may monitor the PDCCH to acquire the uplink resource over the new active bandwidth part configured with PDCCH after transmitting the scheduling request.

Referring to FIG. 14, in step S1401, UE may activate a bandwidth part which is not configured with PDCCH for all cells that belong to a cell group.

For example, there may be no PDCCH to monitor for the cell group.

For example, the bandwidth part which is not configured with PDCCH may be a dormant bandwidth part. The dormant bandwidth part may be at least one bandwidth part among configured multiple bandwidth parts (for example, four bandwidth parts). The dormant bandwidth part may be pre-configured. The dormant bandwidth part may be activated by the BWP switching, which is controlled by the PDCCH indicating a downlink assignment or an uplink grant, by the bwp-InactivityTimer, by RRC signalling, or by the MAC entity itself upon initiation of Random Access procedure. Upon activation of the dormant bandwidth part, the UE may not need to monitor PDCCH for the corresponding cell.

For example, for the dormant bandwidth part, PDCCH may not be configured. If the dormant bandwidth part is activated, there may be no PDCCH to monitor for the corresponding cell.

For example, UE may consider a cell is in dormant state (for example, dormant cell), if PDCCH is not configured for active bandwidth part of the cell.

For example, UE may consider that a cell group is in dormant state, if the corresponding SpCell (for example, PCell or PSCell) is in dormant state. For example, PDCCH is not configured for the active bandwidth part of the corresponding SpCell.

For example, UE may consider a cell group is in dormant state if all cells that belong to the cell group is in dormant state.

For example, UE may determine whether a cell group is in dormant or not based on activated serving cell only. UE may consider a cell group is in dormant state if all activated serving cells that belong to the cell group is in dormant state.

In step S1402, UE may trigger a scheduling request for the cell group.

The scheduling request may be triggered for the dormant cell group. For example, the scheduling request may be triggered in a MAC entity corresponding to the cell group in dormant state.

In step S1403, UE may autonomously change the active bandwidth part of a certain cell that belongs to the cell group to another bandwidth part where the PDCCH is configured.

If the scheduling request is triggered in the dormant cell group, UE may autonomously change the active bandwidth part (for example, bandwidth part not configured with PDCCH) of a certain cell that belongs to the cell group, to another bandwidth part configured with PDCCH.

In other words, the UE may deactivate the current active bandwidth part (for example, the bandwidth part that is not configured with PDCCH) and activate another bandwidth part that is configured with PDCCH. For example, the UE may perform BWP switching from the current downlink active bandwidth part (for example, the downlink bandwidth part not configured with PDCCH) to another downlink bandwidth part configured with PDCCH for a certain cell.

According to some embodiments of the present disclosure, if PUCCH is not configured for the active UL BWP, UE may perform UL BWP switching also. If the scheduling request is triggered in the dormant cell group, the UE may perform BWP switching from the current uplink active bandwidth part (for example, the uplink bandwidth part not configured with PUCCH) to another uplink bandwidth part configured with PUCCH for a certain cell.

The certain cell that belongs to the dormant cell group can be selected in a several ways, as follows.

For example, the certain cell may be SpCell of the cell group. For example, if the dormant cell group is a secondary cell group, the certain cell may be a PSCell. In this case, the UE may change the active bandwidth part of the SpCell of the cell group.

For example, the certain cell may be selected by the UE among cells that belong to the cell group. For example, cell 1, 2, 3 and 4 belong to the dormant cell group, and PDCCH is configured for cell 1, 2, and 3. Then, UE can choose cell 1, 2, or 3 as the certain cell, and change the active bandwidth part of the selected cell.

For example, the certain cell may be set by network per cell group. In this case, the UE may change the active bandwidth part of the cell designated by network.

For example, the certain cell may be more than one cell. If the certain cell is more than one, UE may change the active bandwidth part of the more than one cell. For example, UE may change the active bandwidth part of all cells that belong to the cell group.

Another bandwidth part to be activated can be selected in a several ways, as follows.

For example, the new active bandwidth part may be initial bandwidth part. In this case, UE may change the active bandwidth part of the certain cell to the initial bandwidth part. The initial bandwidth part may be a bandwidth part used for initial access. The initial bandwidth part may be detected from system information. The initial bandwidth part may be referred to by BWP-Id=0. For example, UE may switch the active DL BWP to BWP indicated by initialDownlinkBWP. UE may switch the active UL BWP to BWP indicated by initialUplinkBWP.

For example, the new active bandwidth part may be default bandwidth part. In this case, UE may change the active bandwidth part of the certain cell to the default bandwidth part. The default bandwidth part may be a bandwidth part to be used upon expiry of the BWP inactivity timer. The UE may use the initial bandwidth part as the default bandwidth part. For example, UE may switch the active DL BWP to BWP indicated by defaultDownlinkBWP.

For example, UE may select a DL bandwidth part among DL bandwidth parts configured with PDCCH, and change the DL active bandwidth part to the selected DL bandwidth part.

For example, UE may select a UL bandwidth part among UL bandwidth parts configured with PUCCH, and change the UL active bandwidth part to the selected UL bandwidth part.

For example, network may predefine a DL bandwidth part having PDCCH and/or a UL bandwidth part having PUCCH. In this case, UE may change the active bandwidth part to the predefined bandwidth part.

Hereinafter, an example of a bandwidth part (BWP) operation for autonomous changing for dormant bandwidth part performed by a wireless device, according to some embodiments of the present disclosure, may be described.

A Serving Cell may be configured with one or multiple BWPs.

The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signalling, or by the MAC entity itself upon initiation of Random Access procedure or triggering of Scheduling Request.

Upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL.

Upon initiation of the Scheduling Request procedure, the MAC entity shall for SpCell:
1> if PDCCH is not configured for the active DL BWP:
2> switch the active DL BWP to BWP indicated by initialDownlinkBWP;
1> if PUCCH is not configured for the active UL BWP:
2> switch the active UL BWP to BWP indicated by initialUplinkBWP;

Hereinafter, an apparatus for autonomous changing for dormant bandwidth part in a wireless communication system, according to some embodiments of the present disclosure, will be described. Herein, the apparatus may be a wireless device (100 or 200) in FIGS. 2, 3, and 5.

For example, a wireless device may perform methods described in FIGS. 13, 15, and 16. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to configure a cell group including a certain cell on which a Physical Uplink Control Channel (PUCCH) is configured. The processor 102 may be configured to activate a dormant bandwidth part (BWP) of the certain cell to be an active BWP of the certain cell, wherein no Physical Downlink Control Channel (PDCCH) is configured on the dormant BWP. The processor 102 may be configured to trigger scheduling request procedure for the cell group. The processor 102 may be configured to switch the active BWP of the certain cell from the dormant BWP to another BWP upon triggering the scheduling request procedure, wherein at least one PDCCH is configured on the other BWP.

According to some embodiments of the present disclosure, the cell group may be a Secondary Cell Group (SCG), and the certain cell may be a Primary SCell (PSCell) or a PUCCH SCell, wherein the PSCell and the PUCCH SCell are included in the SCG.

In this case, the processor 102 may be configured to activate each dormant BWP of the PSCell and the PUCCH SCell to be an active BWP, respectively.

According to some embodiments of the present disclosure, the switching may be performed based on that each activated BWP of all cells configuring at least one PUCCH among the cell group is a dormant BWP, respectively.

According to some embodiments of the present disclosure, the scheduling request procedure may include transmitting a scheduling request to a network via the PUCCH configured on the certain cell.

For example, the PUCCH may be configured on the dormant BWP of the certain cell and the scheduling request may be transmitted to the network before switching the active BWP of the certain cell.

For other example, the PUCCH may be configured on the other BWP of the certain cell and the scheduling request may be transmitted to the network after switching the active BWP of the certain cell.

According to some embodiments of the present disclosure, the processor 102 may be configured to monitor the at least one PDCCH configured on the other BWP of the certain cell, after switching the active BWP of the certain cell.

For example, the processor 102 may be configured to acquire an uplink resource via the at least one PDCCH configured on the other BWP of the certain cell in response to the scheduling request procedure.

According to some embodiments of the present disclosure, the processor 102 may be configured to skip to monitor PDCCH on the certain cell, while the dormant BWP of the certain cell is activated.

According to some embodiments of the present disclosure, the processor 102 may be configured to determine that the cell group is in dormant state based on that each activated BWP of all cells belonging to the cell group is a dormant BWP, respectively.

For example, the switching may be performed based on the determination that the cell group is in dormant state.

According to some embodiments of the present disclosure, the other BWP may be an initial BWP and/or a default BWP.

According to some embodiments of the present disclosure, the processor 102 may be configured to be in communication with at least one of a user equipment, a network, or an autonomous vehicle other than the wireless device.

Hereinafter, a processor for a wireless device for autonomous changing for dormant bandwidth part in a wireless communication system, according to some embodiments of the present disclosure, will be described.

The processor may be configured to control the wireless device to configure a cell group including a certain cell on which a Physical Uplink Control Channel (PUCCH) is configured. The processor may be configured to control the wireless device to activate a dormant bandwidth part (BWP) of the certain cell to be an active BWP of the certain cell, wherein no Physical Downlink Control Channel (PDCCH) is configured on the dormant BWP. The processor may be configured to control the wireless device to trigger scheduling request procedure for the cell group. The processor may be configured to control the wireless device to switch the active BWP of the certain cell from the dormant BWP to another BWP upon triggering the scheduling request procedure, wherein at least one PDCCH is configured on the other BWP.

According to some embodiments of the present disclosure, the cell group may be a Secondary Cell Group (SCG), and the certain cell may be a Primary SCell (PSCell) or a PUCCH SCell, wherein the PSCell and the PUCCH SCell are included in the SCG.

In this case, the processor may be configured to control the wireless device to activate each dormant BWP of the PSCell and the PUCCH SCell to be an active BWP, respectively.

According to some embodiments of the present disclosure, the switching may be performed based on that each activated BWP of all cells configuring at least one PUCCH among the cell group is a dormant BWP, respectively.

According to some embodiments of the present disclosure, the scheduling request procedure may include transmitting a scheduling request to a network via the PUCCH configured on the certain cell.

For example, the PUCCH may be configured on the dormant BWP of the certain cell and the scheduling request may be transmitted to the network before switching the active BWP of the certain cell.

For other example, the PUCCH may be configured on the other BWP of the certain cell and the scheduling request may be transmitted to the network after switching the active BWP of the certain cell.

According to some embodiments of the present disclosure, the processor may be configured to control the wireless device to monitor the at least one PDCCH configured on the other BWP of the certain cell, after switching the active BWP of the certain cell.

For example, the processor may be configured to control the wireless device to acquire an uplink resource via the at least one PDCCH configured on the other BWP of the certain cell in response to the scheduling request procedure.

According to some embodiments of the present disclosure, the processor may be configured to control the wireless device to skip to monitor PDCCH on the certain cell, while the dormant BWP of the certain cell is activated.

According to some embodiments of the present disclosure, the processor may be configured to control the wireless device to determine that the cell group is in dormant state based on that each activated BWP of all cells belonging to the cell group is a dormant BWP, respectively.

For example, the switching may be performed based on the determination that the cell group is in dormant state.

According to some embodiments of the present disclosure, the other BWP may be an initial BWP and/or a default BWP.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for autonomous changing for dormant bandwidth part in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to configure a cell group including a certain cell on which a Physical Uplink Control Channel (PUCCH) is configured. The stored a plurality of instructions may cause the wireless device to activate a dormant bandwidth part (BWP) of the certain cell to be an active BWP of the certain cell, wherein no Physical Downlink Control Channel (PDCCH) is configured on the dormant BWP. The stored a plurality of instructions may cause the wireless device to trigger scheduling request procedure for the cell group. The stored a plurality of instructions may cause the wireless device to switch the active BWP of the certain cell from the dormant BWP to another BWP upon triggering the scheduling request procedure, wherein at least one PDCCH is configured on the other BWP.

According to some embodiments of the present disclosure, the cell group may be a Secondary Cell Group (SCG), and the certain cell may be a Primary SCell (PSCell) or a PUCCH SCell, wherein the PSCell and the PUCCH SCell are included in the SCG.

In this case, the stored a plurality of instructions may cause the wireless device to activate each dormant BWP of the PSCell and the PUCCH SCell to be an active BWP, respectively.

According to some embodiments of the present disclosure, the switching may be performed based on that each activated BWP of all cells configuring at least one PUCCH among the cell group is a dormant BWP, respectively.

According to some embodiments of the present disclosure, the scheduling request procedure may include transmitting a scheduling request to a network via the PUCCH configured on the certain cell.

For example, the PUCCH may be configured on the dormant BWP of the certain cell and the scheduling request may be transmitted to the network before switching the active BWP of the certain cell.

For other example, the PUCCH may be configured on the other BWP of the certain cell and the scheduling request may be transmitted to the network after switching the active BWP of the certain cell.

According to some embodiments of the present disclosure, the stored a plurality of instructions may cause the wireless device to monitor the at least one PDCCH configured on the other BWP of the certain cell, after switching the active BWP of the certain cell.

For example, the stored a plurality of instructions may cause the wireless device to acquire an uplink resource via the at least one PDCCH configured on the other BWP of the certain cell in response to the scheduling request procedure.

According to some embodiments of the present disclosure, the stored a plurality of instructions may cause the wireless device to skip to monitor PDCCH on the certain cell, while the dormant BWP of the certain cell is activated.

According to some embodiments of the present disclosure, the stored a plurality of instructions may cause the wireless device to determine that the cell group is in dormant state based on that each activated BWP of all cells belonging to the cell group is a dormant BWP, respectively.

For example, the switching may be performed based on the determination that the cell group is in dormant state.

According to some embodiments of the present disclosure, the other BWP may be an initial BWP and/or a default BWP.

According to some embodiments of the present disclosure, the stored a plurality of instructions may cause the wireless device to be in communication with at least one of a user equipment, a network, or an autonomous vehicle other than the wireless device.

Hereinafter, a method performed by a base station (BS) for autonomous changing for dormant bandwidth part in a wireless communication system, according to some embodiments of the present disclosure, will be described.

The BS may receive, from a wireless device, a scheduling request in a scheduling request procedure Hereinafter, a base station (BS) for autonomous changing for dormant bandwidth part in a wireless communication system, according to some embodiments of the present disclosure, will be described.

The BS may include a transceiver, a memory, and a processor operatively coupled to the transceiver and the memory.

The processor may be configured to control the transceiver to receive, from a wireless device, a scheduling request via a PUCCH on a first BWP. The processor may be configured to control the transceiver to transmit, to the wireless device, an uplink resource in response to the scheduling request via a PDCCH on a second BWP.

According to some embodiments of the present disclosure, the first BWP may be a dormant BWP on which no PDCCH is configured. In this case, the second BWP may be not a dormant BWP on which at least one PDCCH is configured. For example, the wireless device may perform autonomous BWP switching from the first BWP to the second BWP.

According to some embodiments of the present disclosure, the first BWP and the second BWP may be not a dormant BWP on which at least one PDCCH is configured. For example, the first BWP may be same with the second BWP. For example, the wireless device may perform autonomous BWP switching before transmitting the scheduling request.

Hereinafter, a method performed by a base station (BS) for autonomous changing for dormant bandwidth part in a wireless communication system, according to some embodiments of the present disclosure, will be described.

The BS may receive, from a wireless device, a scheduling request via a PUCCH on a first BWP. The BS may transmit, to the wireless device, an uplink resource in response to the scheduling request via a PDCCH on a second BWP.

According to some embodiments of the present disclosure, the first BWP may be a dormant BWP on which no PDCCH is configured. In this case, the second BWP may be not a dormant BWP on which at least one PDCCH is configured. For example, the wireless device may perform autonomous BWP switching from the first BWP to the second BWP.

According to some embodiments of the present disclosure, the first BWP and the second BWP may be not a dormant BWP on which at least one PDCCH is configured. For example, the first BWP may be same with the second BWP. For example, the wireless device may perform autonomous BWP switching before transmitting the scheduling request.

Hereinafter, a base station (BS) for autonomous changing for dormant bandwidth part in a wireless communication system, according to some embodiments of the present disclosure, will be described.

The BS may include a transceiver, a memory, and a processor operatively coupled to the transceiver and the memory.

The processor may be configured to control the transceiver to receive, from a wireless device, a scheduling request via a PUCCH on a first BWP. The processor may be configured to control the transceiver to transmit, to the wireless device, an uplink resource in response to the scheduling request via a PDCCH on a second BWP.

The present disclosure can have various advantageous effects.

According to some embodiments of the present disclosure, a wireless device could perform autonomous switching for dormant bandwidth part efficiently.

For example, when all cells that belong to a cell group are in dormant state for power saving, a wireless device could transmit the essential uplink (UL) data (for example, UL RRC message) by changing active bandwidth part autonomously.

According to some embodiments of the present disclosure, a wireless communication system could efficiently provide a solution for using the dormant bandwidth part by applying the autonomous changing for the dormant bandwidth part.

For example, even if all cells that belong to a cell group are in dormant state, network could receive the essential uplink (UL) data (for example, UL RRC message) by applying the autonomous bandwidth part changing for the dormant bandwidth part.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method, comprising,
configuring, by a wireless device, a dual connectivity with a master cell group and a secondary cell group, wherein the secondary cell group includes a certain cell on which an uplink control channel is configured, and wherein the certain cell is a primary cell of the secondary cell group;
activating, by the wireless device, a first bandwidth part of the certain cell to be an active bandwidth part of the certain cell, wherein no downlink control channel is configured on the first bandwidth part;
skipping, by the wireless device, monitoring downlink control channel on the certain cell, while the first bandwidth part of the certain cell is activated;
triggering, by the wireless device, scheduling request procedure corresponding to the secondary cell group;
determining, by the wireless device, that the secondary cell group is in a dormant state, based on that no downlink control channel is configured for each activated bandwidth part of all cells belonging to the secondary cell group, upon triggering the scheduling request procedure;
selecting, by the wireless device, a second bandwidth part of the certain cell on which at least one downlink control channel and the uplink control channel is configured;
performing, by the wireless device, autonomous bandwidth part switching of the active bandwidth part from the first bandwidth part to the second bandwidth part, by deactivating the first bandwidth part and activating the second bandwidth part, based on determining that the secondary cell group is in the dormant state;
transmitting, by the wireless device to a network, a scheduling request for the secondary cell group via the uplink control channel configured on the second bandwidth part of the certain cell after the autonomous switching;
monitoring, by the wireless device, the at least one downlink control channel configured for the second bandwidth part of the certain cell; and
acquiring, by the wireless device from the network, at least one uplink resource via the at least one downlink control channel configured on the second bandwidth part of the certain cell, in response to the scheduling request.

2. The method of claim 1, wherein the wireless device is in communication with at least one of a user equipment, a network, or an autonomous vehicle other than the wireless device.

3. A wireless device, comprising:
a transceiver;
a memory; and
at least one processor operatively coupled to the transceiver and the memory, and configured to perform operations, the operations comprising:
configuring a dual connectivity with a master cell group and a secondary cell group, wherein the secondary cell group includes a certain cell on which an uplink control channel is configured, and wherein the certain cell is a primary cell of the secondary cell group;
activating a first bandwidth part of the certain cell to be an active bandwidth part of the certain cell, wherein no downlink control channel is configured on the first bandwidth part;
skipping monitoring downlink control channel on the certain cell, while the first bandwidth part of the certain cell is activated;
triggering scheduling request procedure corresponding to the secondary cell group;
determining that the secondary cell group is in a dormant state, based on that no downlink control channel is configured for each activated bandwidth part of all cells belonging to the secondary cell group, upon triggering the scheduling request procedure;
selecting a second bandwidth part of the certain cell on which at least one downlink control channel and the uplink control channel is configured;
performing autonomous bandwidth part switching of the active bandwidth part from the first bandwidth part to the second bandwidth part, by deactivating the first bandwidth part and activating the second bandwidth part, based on determining that the secondary cell group is in the dormant state;
transmitting, from a network, a scheduling request for the secondary cell group via the uplink control channel configured on the second bandwidth part of the certain cell after the autonomous switching;
monitoring the at least one downlink control channel configured for the second bandwidth part of the certain cell; and
acquiring, from the network, at least one uplink resource via the at least one downlink control channel configured on the second bandwidth part of the certain cell, in response to the scheduling request.

4. A non-transitory computer-readable medium having stored thereon a plurality of instructions, which, when executed by a processor of a wireless device, cause the wireless device to perform operations, the operations comprising:
configuring a dual connectivity with a master cell group and a secondary cell group, wherein the secondary cell group includes a certain cell on which an uplink control channel is configured, and wherein the certain cell is a primary cell of the secondary cell group;
activating a first bandwidth part of the certain cell to be an active bandwidth part of the certain cell, wherein no downlink control channel is configured on the first bandwidth part;
skipping monitoring downlink control channel on the certain cell, while the first bandwidth part of the certain cell is activated;
triggering scheduling request procedure corresponding to the secondary cell group;
determining that the secondary cell group is in a dormant state, based on that no downlink control channel is configured for each activated bandwidth part of all cells belonging to the secondary cell group, upon triggering the scheduling request procedure;

selecting a second bandwidth part of the certain cell on which at least one downlink control channel and the uplink control channel is configured;

performing autonomous bandwidth part switching of the active bandwidth part from the first bandwidth part to the second bandwidth part, by deactivating the first bandwidth part and activating the second bandwidth part, based on determining that the secondary cell group is in the dormant state;

transmitting, from a network, a scheduling request for the secondary cell group via the uplink control channel configured on the second bandwidth part of the certain cell after the autonomous switching;

monitoring the at least one downlink control channel configured for the second bandwidth part of the certain cell; and acquiring, from the network, at least one uplink resource via the at least one downlink control channel configured on the second bandwidth part of the certain cell, in response to the scheduling request.

* * * * *